US008111879B2

(12) United States Patent
Phinney et al.

(10) Patent No.: US 8,111,879 B2
(45) Date of Patent: Feb. 7, 2012

(54) FACE AND IRIS IMAGING SYSTEM AND METHOD

(75) Inventors: Thomas L. Phinney, Glendale, AZ (US); Jan Jelinek, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 1104 days.

(21) Appl. No.: 11/784,571

(22) Filed: Apr. 5, 2007

(65) Prior Publication Data

US 2008/0246917 A1    Oct. 9, 2008

(51) Int. Cl.
*G06K 9/00* (2006.01)
(52) U.S. Cl. ........................................................ 382/117
(58) Field of Classification Search ........... 382/115–127
See application file for complete search history.

(56) References Cited

U.S. PATENT DOCUMENTS

| | | | |
|---|---|---|---|
| 5,956,122 A | 9/1999 | Doster | |
| 6,714,665 B1 * | 3/2004 | Hanna et al. ................. | 382/117 |
| 7,095,901 B2 | 8/2006 | Lee et al. ...................... | 382/255 |
| 2003/0012413 A1 | 1/2003 | Kusakari et al. | |

FOREIGN PATENT DOCUMENTS

| | | |
|---|---|---|
| GB | 2375913 A | 11/2002 |
| WO | WO2006/023046 A1 | 3/2006 |
| WO | WO2006/063076 A2 | 6/2006 |

OTHER PUBLICATIONS

M.E. Bazakos, Y. Ma, A. H. Johnson; Fast Access Control Technology Solutions (FACTS); Proceedings. IEEE Conference on Advanced Video and Signal Based Surveillance, Italy, Sep. 15-Sep. 16, 2005.
Z. Zhang, R. Wang, K. Pan, S.Z. Li, P. Zhang; Fusion of Near Infrared Face and Iris Biometrics; Advances in Biometrics Lecture Notes in Computer Science, vol. 4642.
PCT—Notification of Transmittal of the International Search Report and the Written Opinion of the International Searching Authority, or the Declaration, Date of Mailing Jun. 19, 2008.

* cited by examiner

*Primary Examiner* — Daniel Mariam
*Assistant Examiner* — Elisa Rice
(74) *Attorney, Agent, or Firm* — Kermit D. Lopez; Luis M. Ortiz; Melissa Asfahani

(57) ABSTRACT

A duplex camera with common face and iris imaging optics locates an iris in a scene and images the iris without requiring multiple camera alignment or a rapid zoom capability. A wavelength selective mirror separates the light from an imaged scene into visible and infrared components. The visible component supplies a face image in which an iris location can be determined. Visible light optics and a visible light sensor array provide a scene image to an image processor that determines the iris location. Infrared optics and an infrared sensor produce an iris image centered on the iris location. Upon determining an iris location, a motorized stage can position the iris image in the infrared sensor. The common face and imaging optics allow the image sensors to be permanently aligned to one another.

17 Claims, 6 Drawing Sheets

FACE AND IRIS IMAGING SYSTEM AND METHOD

TECHNICAL FIELD

Embodiments relate to biometrics, electronic imaging, pattern recognition, face recognition, and iris recognition. Embodiments also relate to optomechanical systems, motion control, and motor control. Embodiments additionally relate to optics, infrared optics, dichroic reflectors, motorized lenses, driven optics, and autofocus.

BACKGROUND OF THE INVENTION

Biometric identification is a field including many different technologies for recognizing and tracking people. Face recognition and iris recognition are two biometric identification techniques based on electronic imaging and pattern recognition. Face recognition can be performed at two levels. At one level, the presence of a face in a scene can be noticed and the location of the face determined. At the second level, the face is examined and compared to a library of known or previously observed faces. In many cases, the face can be recognized or identified.

Iris recognition is a biometric technique in which a person is recognized or identified based on the unique patterns and structures in one or both of the person's irises. An infrared camera is often used in iris recognition applications. Locating an iris in a scene can be difficult because it is small relative to other things such as faces. An iris can be easily located when a person is precisely positioned in front of a camera and required to look into the camera. A less intrusive technique for iris recognition employs a camera that images a scene in which faces and eyes can be located. A second camera then attempts to image the iris. This technique requires a high degree of alignment precision to ensure that the camera images are aligned on the same spot. Systems and methods that address shortcomings in the current technology are needed.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

It is therefore an aspect of the embodiments that light from an imaged scene enters into an imagining port. Light has a propagation vector. An input beam is light entering the imaging port with a propagation vector parallel, within certain tolerances, to an acceptance vector.

It is also an aspect of the embodiments that the input light is incident on a wavelength selective mirror. Hot mirrors and cold mirrors are examples of wavelength selective mirrors. In certain applications, a hot mirror is a wavelength selective mirror that reflects infrared light and transmits visible light. In certain other applications, a cold mirror is a wavelength selective mirror that reflects visible light and transmits infrared light. The input light has infrared and visible components. The wavelength selective mirror directs the visible component along a first optical path and directs the infrared component along a second optical path. Those practiced in the art of dichroic reflectors are familiar with wavelength selective mirrors.

It is an additional aspect of the embodiments that an infrared optics module images the infrared component onto an infrared sensor array that then produces an infrared image. Similarly, a visible light optics module images the visible component onto a visible light sensor array that then produces a visible light image.

BRIEF DESCRIPTION OF THE DRAWINGS

The accompanying figures, in which like reference numerals refer to identical or functionally similar elements throughout the separate views and which are incorporated in and form a part of the specification, further illustrate aspects of the embodiments and, together with the background, brief summary, and detailed description serve to explain the principles of the embodiments.

DETAILED DESCRIPTION

The particular values and configurations discussed in these non-limiting examples can be varied and are cited merely to illustrate at least one embodiment and are not intended to limit the scope thereof. In general, the figures are not to scale.

A duplex camera with common face and iris imaging optics locates an iris in a scene and images the iris without requiring multiple camera alignment or a rapid zoom capability. A wavelength selective mirror separates the light from an imaged scene into visible and infrared components. The visible component supplies a face image in which an iris location can be determined. Visible light optics and a visible light sensor array provide a scene image to an image processor that determines the iris location. The scene image also may be used for face recognition or for other purposes. Infrared optics and an infrared sensor produce an iris image centered on the iris location. Upon determining an iris location, a driven stage can position the iris image in the infrared sensor. The common face and imaging optics allow the image sensors to share all of the optical elements upstream of the wavelength selective mirror. For example, a large zoom lens on the front of the duplex camera operates as a zoom for both the visible and the infrared components. Furthermore, zooming, panning and tilting operations can have an identical effect on both visible light images and infrared images. As such, features in the visible light image can be easily mapped to their infrared counterparts and vice versa.

Figure 1:
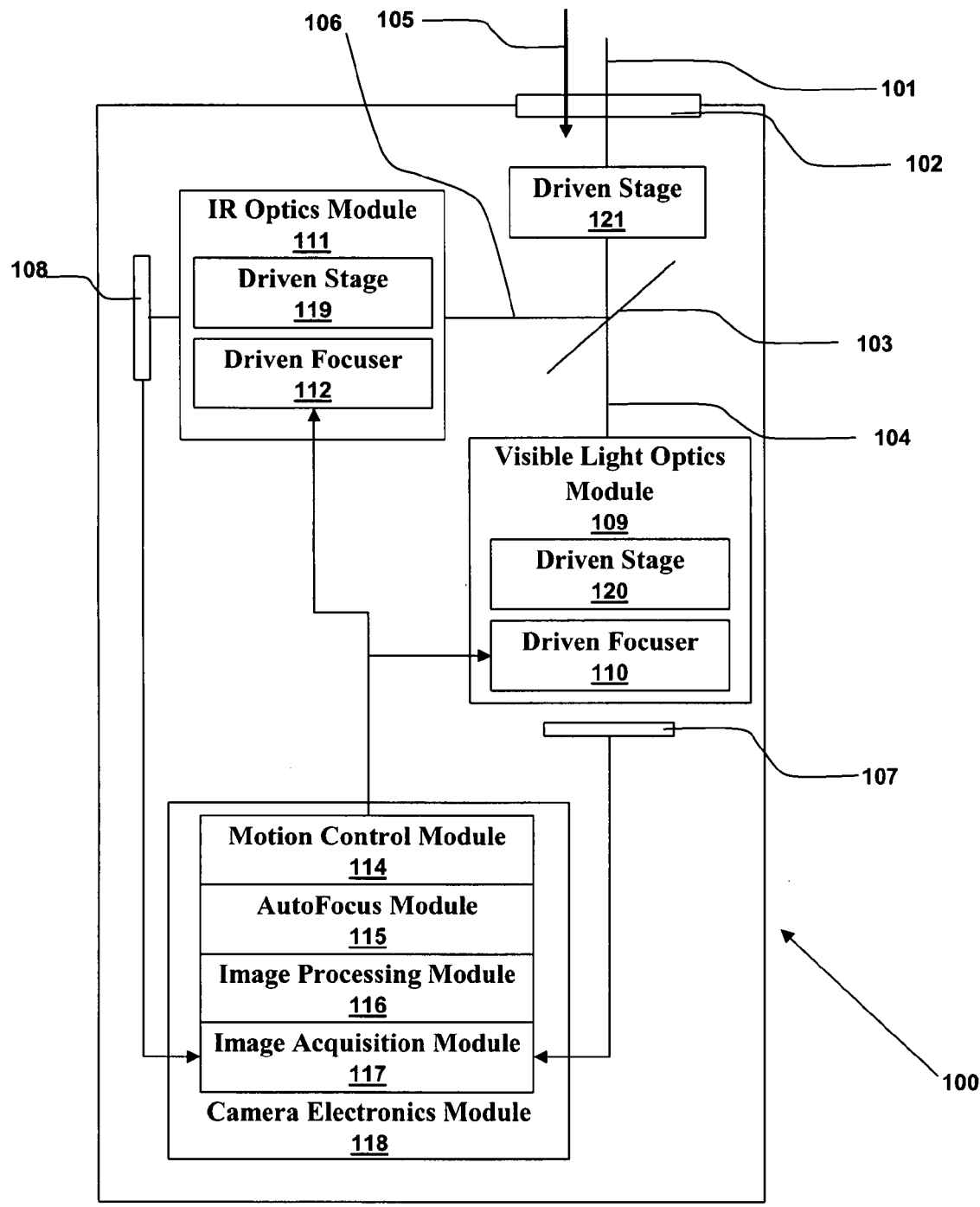
FIG. 1 illustrates a high level block diagram of a duplex camera in accordance with aspects of the embodiments.

FIG. 1 illustrates a high level block diagram of a duplex camera 100 in accordance with aspects of the embodiments. As illustrated, the duplex camera 100 contains optics as well as electronics. In practice, the size and complexity of, and heat generated by, the electronics can dictate that some or most of the electronics be housed in a separate electronics enclosure.

A light input 101 passes through an imaging port 102. The imaging port 102 can be open, have a lens, a motorized zoom lens, an extension tube, or any of the other camera components commonly used in photography and video. The light input 101 propagates through the imaging port 102 and parallel to an acceptance vector 105. The acceptance vector 105 is the direction light must travel in order to be imaged by the sensor arrays 107, 108. The light input 101 has a visible light component that a wavelength selective mirror 103 directs along a first optical path 104 and an infrared component that the wavelength selective mirror 103 directs along a second optical path 106. An infrared optics module 111 images the infrared component onto an infrared sensor array 108. A visible light optics module 109 images the visible component onto a visible light sensor array 107.

The sensor arrays 107, 108 can be arrays of charge coupled devices, charge injection devices, photo diodes, CMOS transistors, or other light sensitive devices. The sensor arrays 107, 108 can be identical or they can be different types of sensors. For example, in some applications the visible light sensor array can be a small format CMOS imager while the infrared sensor array can be a large format CMOS imager with a thermoelectric cooler. A reason for different sensor arrays 107, 108 is that the visible light sensor array receives many photons from the entire scene whereas the infrared optics module zooms in to image a person's iris onto the infrared imager, and therefore receives far fewer photons. Another reason for different sensor arrays 107, 108 is that the efficiencies of such arrays, and their ability to image properly under highly variable lighting conditions, are functions of both their construction and the wavelengths of light that they are imaging.

A camera electronics module 118 can contain an image acquisition module 117, image processing module 116, autofocus module 115, and motion control module 114. The image acquisition module 117 obtains infrared and visible light images from the sensor arrays 107, 108 and passes them to the image processing module 116. The image processing module 116 can locate faces and eyes and determine iris locations in the visible light image. The image processing module 116 can then use the iris location to produce an iris image from the infrared image.

The autofocus module 115 can run an autofocus algorithm and send instructions to a motion control module 114 that drives focusers 110, 112 to focus the images. A driven focuser 110, 112 has at least one actuator or other means for changing focus. An actuator can be an electromagnetic device such as a motor, or a solenoid. An actuator can be electrostatic. Some actuators, such as the fine tracking elements used as image stabilizers in consumer grade cameras, use electromagnetic fields to steer small optical elements. Electromagnetic fields are also used to steer the tiny mirrors in the micro-mirror arrays used in some projection televisions. Those practiced in the art of optical design are familiar with autofocus, autofocus algorithms, and driven focusers 110, 112.

Driven stages 119, 120, 121 can change the areas imaged by the sensor arrays 107, 108. The consumer grade image stabilizers previously discussed are examples of driven stages 119, 120, 121 that do adjust the areas imaged by certain consumer grade cameras.

Figure 2:
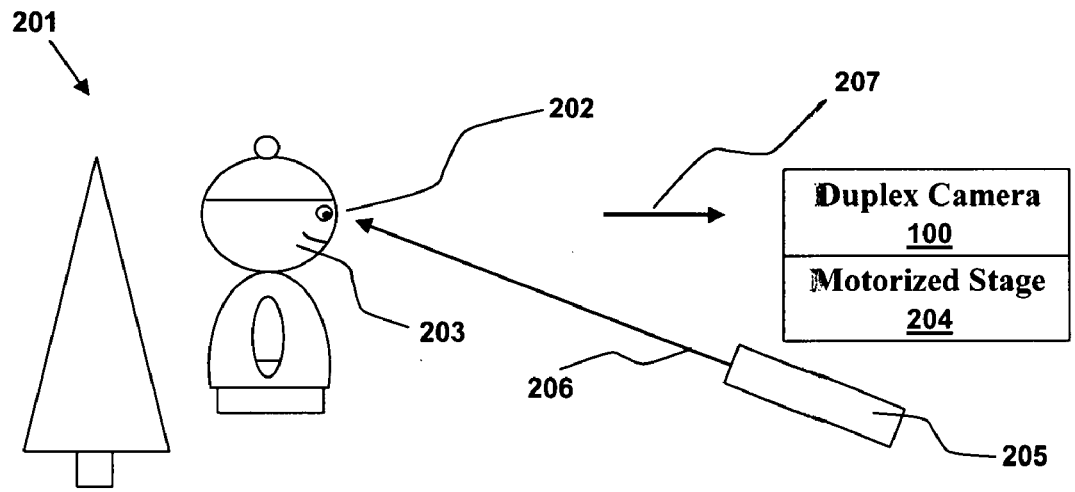
FIG. 2 illustrates a duplex camera imaging a scene illuminated by a collimated infrared light source in accordance with aspects of the embodiments.

FIG. 2 illustrates a duplex camera 100 imaging a scene 201 illuminated by a collimated infrared light source 205 in accordance with aspects of the embodiments. The scene 201 includes a face 203 with eyes 202. The propagation vector 207 is the direction that light propagates. The propagation vector 207 is illustrated as directed into the imaging port 102 of the duplex camera 100. The propagation vector 207 is also sufficiently parallel to the acceptance vector 105 that the scene 201 can be imaged by the duplex camera 100. As such, the scene 201 is an imaged scene. A motorized stage 204 can point the duplex camera 100 directly at the face 203 with the result that light from the face 203 propagates into the imaging port 102 and parallel to the acceptance vector 105. The size and weight of the duplex camera 100 justify the use of a motorized stage 204 although other types of driven stage 119, 120, 121 can be used instead. A collimated infrared light source 205 can send a beam of infrared light of near-constant areal intensity directly toward the eye 202 and thereby illuminate the iris for the infrared sensor to image. The beam can be steered by a driven stage 119, 120, 121 that steers the entire light source, by a driven stage the steers only the beam, or by a combination of stages.

The motorized stage 204 is a large driven stage that can pan, tilt, and zoom the entire duplex camera 100. Driven stages 119, 120, 121 inside the duplex camera 100 can achieve the same effect by changing the areas imaged by the sensor arrays 107, 108. As such, driven stages 119, 120, 121 can steer the entire duplex camera 100, can steer the light input 101 when positioned ahead of the wavelength selective mirror 103, can steer the infrared component when part of the infrared optics module 111, and can steer the visible light component when part of the visible light optics module 109.

Figure 3:
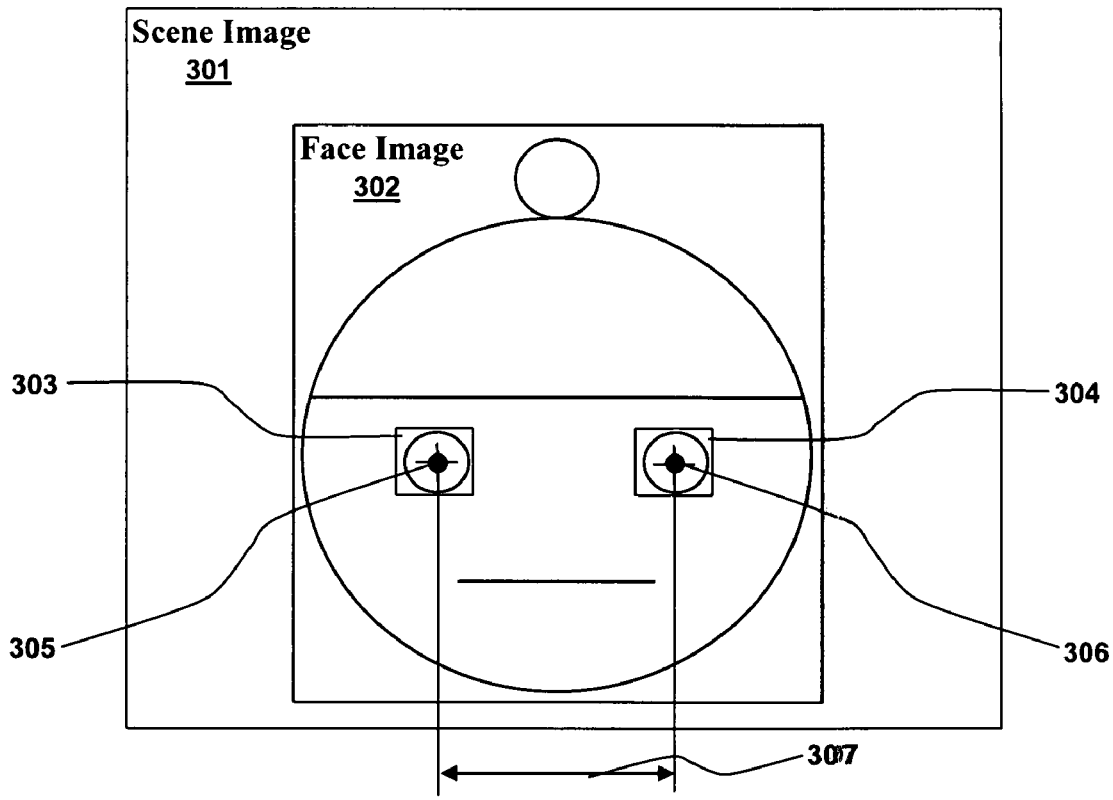
FIG. 3 illustrates scene elements in accordance with aspects of the embodiments.

FIG. 3 illustrates scene 201 elements in accordance with aspects of the embodiments. A scene image 301 can be obtained by focusing a duplex camera 100 on a scene 201 and acquiring an image from the visible sensor array 107. Image processing operations can isolate a face image 302 inside the scene image 301. Further image processing can isolate eye images 303, 304 in the face image 302. Processing the eye images 303, 304 produce the iris locations 304, 306. The iris separation 307 is the distance between the iris locations 305, 306. Those practiced in the arts of image processing and pattern recognition know of systems, techniques, and algorithms for locating faces in scenes 201, eyes 202 in faces 203, and irises in eyes 202.

Figure 4:
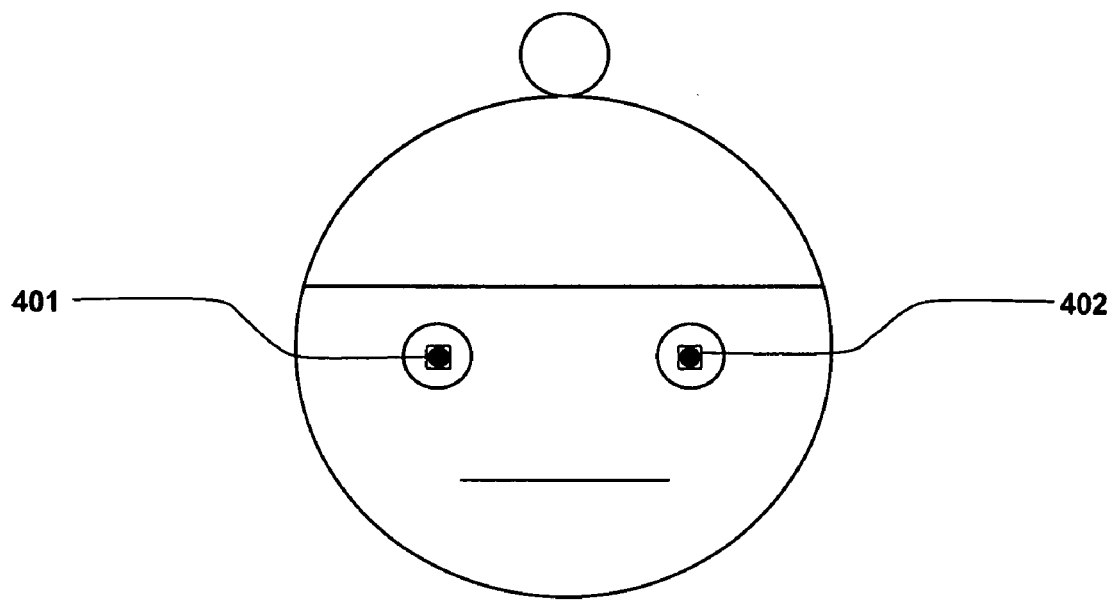
FIG. 4 illustrates iris images in accordance with aspects of the embodiments.

FIG. 4 illustrates iris images 401, 402 in accordance with aspects of the embodiments. In FIG. 2, the duplex camera 100 turns toward the face 203 in the scene 201 to acquire a scene image 301. In FIG. 3, the scene image 301 is processed to locate a face image 302 and one or more eye images 303, 304 and iris locations 305, 306. Finally, FIG. 4 illustrates iris images 401 and/or 402 obtained from the infrared sensor array. The infrared optics module 111 and the visible light optics module 109 can be configured with different magnifications. The visible light optics module 109 can have a magnification for imaging an entire scene 201 onto the visible light sensor array while the infrared optics module 111 have a magnification for imaging an iris within the scene 201 onto the infrared sensor array. After determining an iris location 305, 306, the motorized stage 204 can aim the duplex camera 100 to center the iris image 401, 402 on the infrared sensor array. Alternatively, a driven stage 119, 120, 121 can adjust the area imaged to position the iris image 401, 402 on the infrared sensor while the duplex camera 100 is held still. The duplex camera 100 can track the iris because the visible image and the infrared image can be obtained simultaneously. Those practiced in the arts of optical target tracking, autofocus, or image stabilization are familiar with opto-mechanical assemblies for tracking, positioning, and centering images on a sensor array 107, 108.

Figure 5:
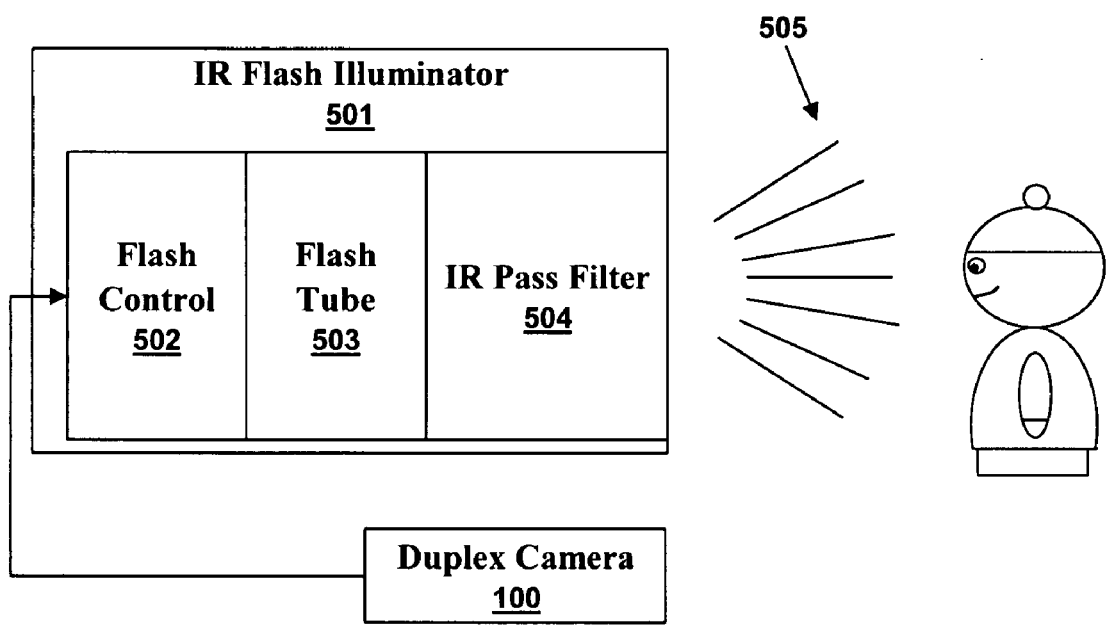
FIG. 5 illustrates a duplex camera imaging a scene illuminated by an infrared flash in accordance with aspects of the embodiments.

FIG. 5 illustrates a duplex camera 100 imaging a scene 201 illuminated by an infrared flash 505 in accordance with aspects of the embodiments. An infrared flash illuminator 501 contains a flash control 502, flash tube 503, and infrared pass filter 504. The duplex camera 100 can trigger the infrared flash 505 after determining an iris location 305, 306 and centering the iris image 401, 402 on the infrared sensor array. As such, the infrared flash illuminator 501 illuminates the iris while the image acquisition module 117 acquires the iris image 401, 402. The flash control 502 can activate the flash tube 503 upon receiving a trigger signal from the duplex camera 100. The flash tube 503 creates a flash of light. The infrared pass filter 504 passes only the infrared light resulting in an infrared flash 505. The infrared flash illuminator 501 can generate either a radially expanding beam, of roughly constant square-angular intensity, independent of distance, or a collimated beam of roughly constant areal intensity, independent of distance. As with the collimated infrared light source 205 of FIG. 2, a flash illuminator 501 or any other illuminator can be steered.

Figure 6:
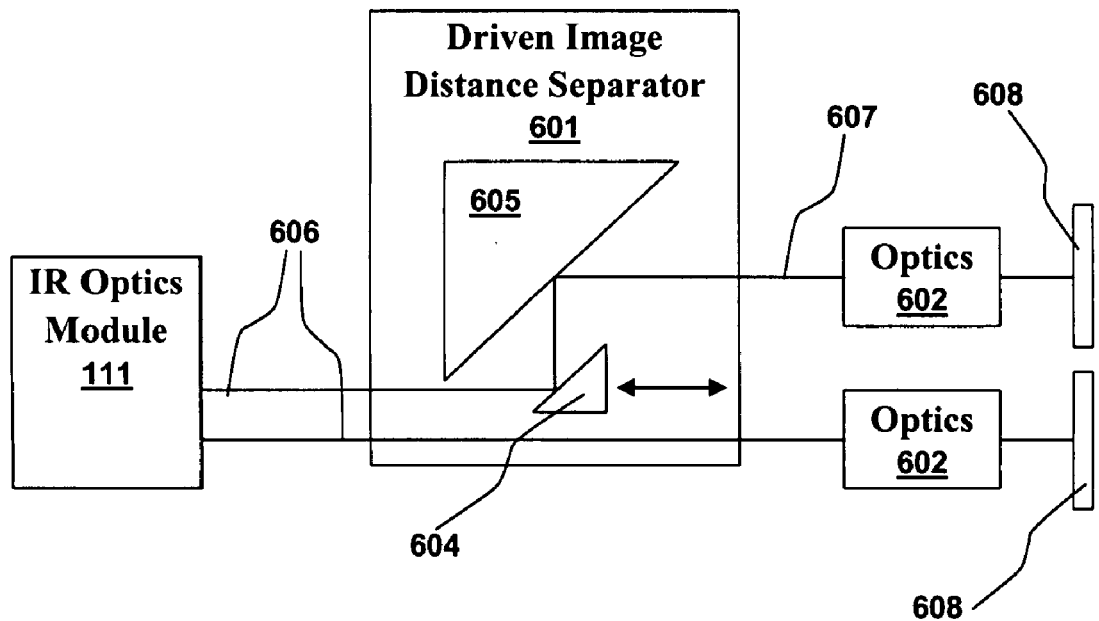
FIG. 6 illustrates a driven image distance separator and two infrared sensor arrays in accordance with aspects of the embodiments.

FIG. 6 illustrates a driven image distance separator 601 and two infrared sensor arrays 608 in accordance with aspects of the embodiments. The infrared component 606 of the light input 101 into a duplex camera 100 can pass from the infrared optics module 111 and into a driven image distance separator 601. A driven image distance separator 601 is an optical component that moves one subimage closer to or farther from another subimage. A subimage is a portion of an image. A driven image distance separator 601 can dynamically adjust the amount of subimage movement. Those practiced in optical systems are familiar with driven image distance separators 601.

A wavelength selective mirror 103 can reflect the infrared component of a light input 101 along a second optical path 606. The second optical path 606 can enter a driven image distance separator 601 after passing through an infrared optics module 111. The infrared component 606 carries an infrared image. Inside the driven image distance separator 601, a first mirror 604 can direct part of the infrared component 606 along a third optical path 607 that has a second mirror 605 and an infrared sensor array 608. In this manner, two parts of an image can be separately imaged onto infrared sensor arrays 608. Additional optics 602 can be positioned along the optical paths 606, 607. The driven image distance separator 601 of FIG. 6 is best suited for increasing the separation between subimages. Two infrared sensor arrays 608 are used for the purpose of illustration. Note that a sensor array can also be positioned to replace the second mirror 605 and thereby reduce component count.

Figure 7:
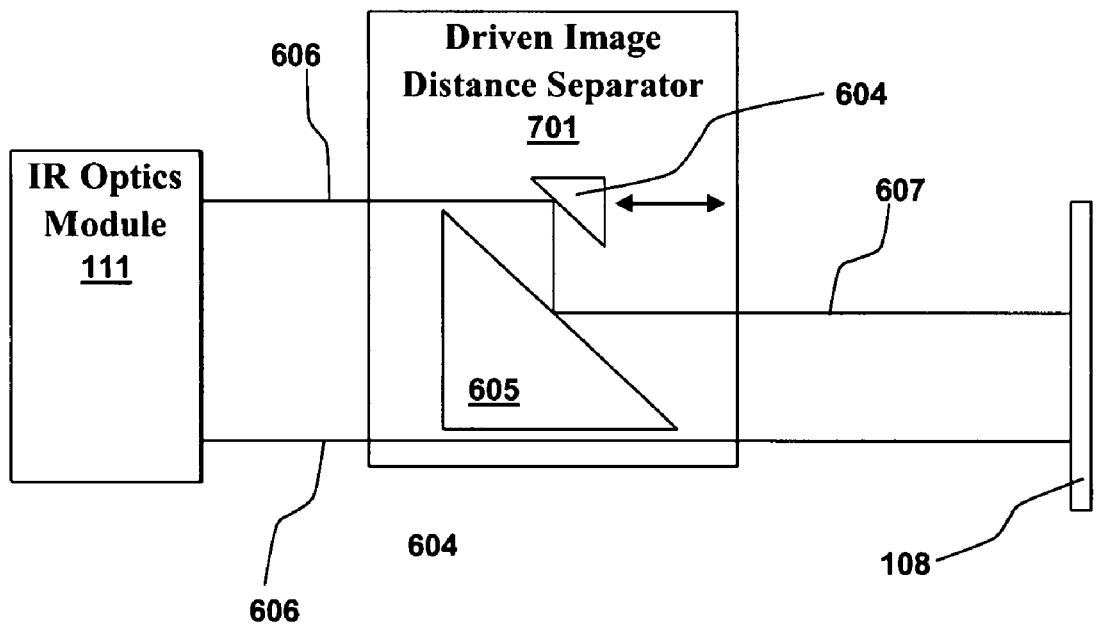
FIG. 7 illustrates a driven image distance separator and a single infrared sensor array in accordance with aspects of the embodiments.

FIG. 7 illustrates a driven image distance separator 702 and a single infrared sensor array 108 in accordance with aspects of the embodiments. In FIG. 7, the positions of the first mirror 604 and second mirror 605 are switched with respect to FIG. 6. As such, the illustrated driven image distance separator 701 is best suited for decreasing the separation between subimages. A single sensor array 108 can be used.

FIGS. 3, 4 illustrated the determination of two iris locations 401, 402 and an iris separation 307. The driven image distance separators 601, 701 of FIGS. 6, 7 can be used in the duplex camera 100. The duplex camera's 100 second optical path 106 can pass through the driven image distance separator 601, 701 such that the right iris image 401 is imaged onto the sensor array 108. The third optical path 607 can be set to move the subimage containing the left iris image 402 onto the sensor array 108. In this manner, both irises can be imaged simultaneously.

Figure 8:
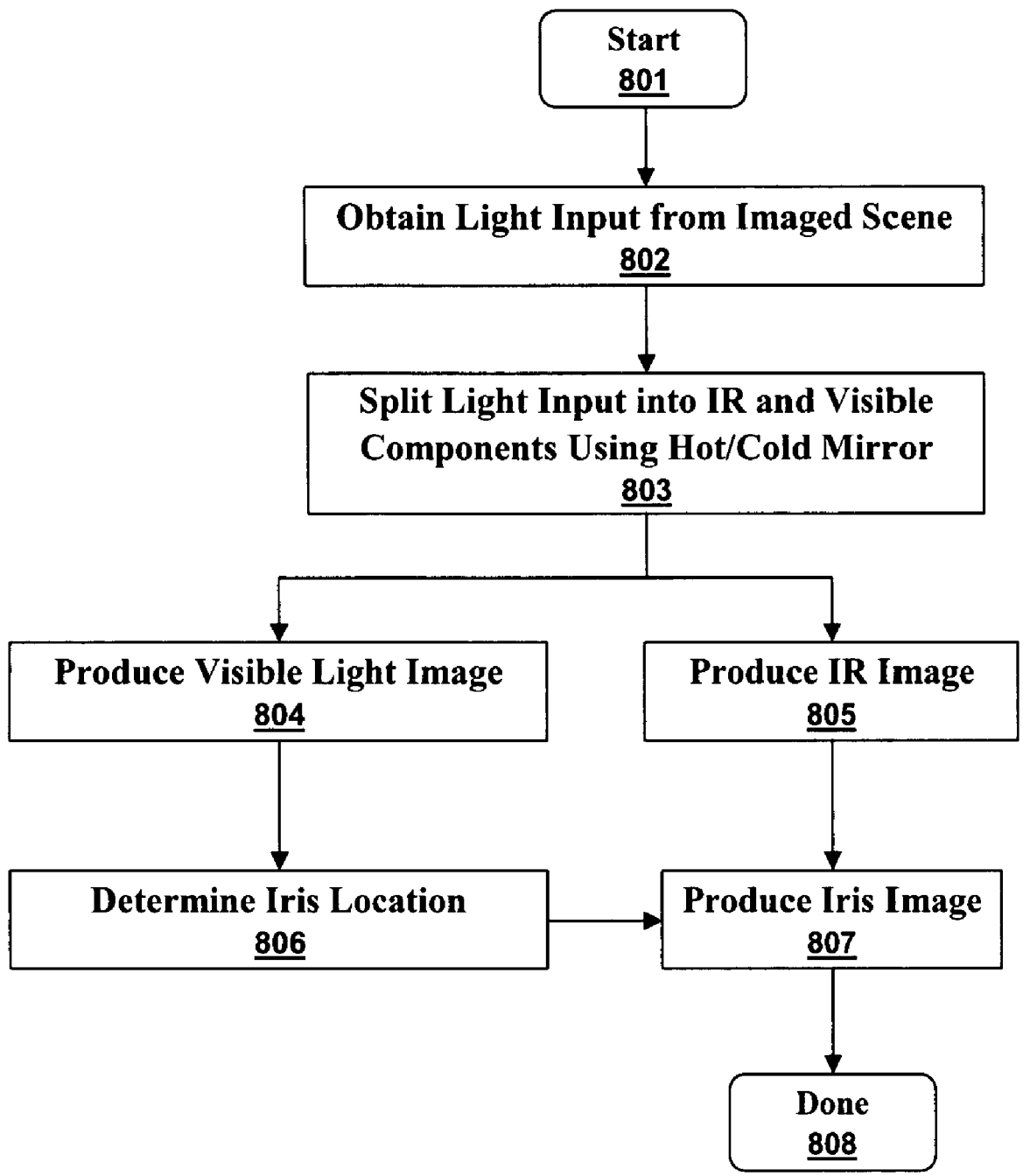
FIG. 8 illustrates a high level flow diagram of obtaining an iris image in accordance with aspects of the embodiments.

FIG. 8 illustrates a high level flow diagram of obtaining an iris image 401, 402 in accordance with aspects of the embodiments. After the start 801 a duplex camera 100 can obtain a light input 101 from an imaged scene 802. A wavelength selective mirror 103 separates the light input 101 into an infrared component 606 and a visible light component 803. A visible light image is produced 804 and an infrared image is also produced 805. The iris location 305, 306 is determined 806 and used to isolate an iris image 401, 402 within the infrared image 807 before the process is completed 808.

Notice that the charted process of FIG. 8 simply locates an iris image 401, 402 within an infrared image. Alternatively, an infrared flash 505 can be synchronized with producing the infrared image 805. Another alternative is that the duplex camera 100 can be aimed to center the iris after the iris location 305, 306 is determined 806 such that an infrared image with a centered iris can be obtained. Yet another alternative is that driven stages 119, 120, 121 alter the imaged area to center the iris after the iris location 305, 306 is determined 806 such that an infrared image with a centered iris can be obtained. In further embodiments, an infrared flash 505 or a steered collimated infrared light source 205 can illuminate the iris. Finally, producing the IR image 805 can include setting a driven image distance separator to 601 compensate for iris separation 307 such that two iris images 401, 402 are obtained concurrently.

Figure 9:
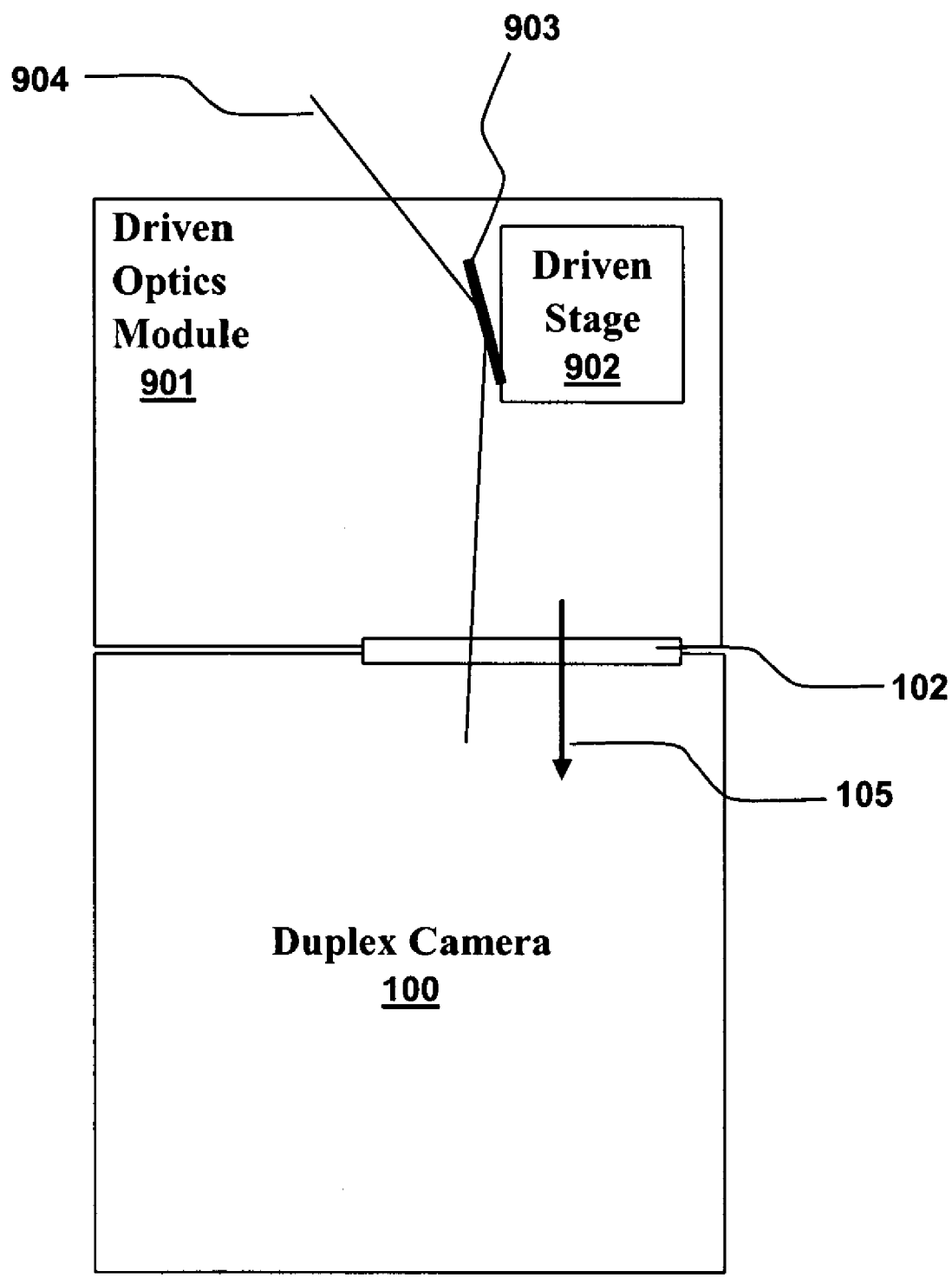
FIG. 9 illustrates a duplex camera with a driven input optics module in accordance with elements of certain embodiments.

FIG. 9 illustrates a duplex camera 100 with a driven input optics module 901 in accordance with elements of certain embodiments. The driven input optics module 901 contains a driven stage 902 that moves optical elements. A mirror 903 can be one of the moved optical elements. The mirror 903 can redirect a light input 904 to be parallel with the duplex camera's 100 acceptance vector 105. As such, the driven stage 902 can move the mirror 903 to redirect the propagation vector 207 of the light input 904.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

Having thus described the invention what is claimed is:

1. A face and iris imaging system comprising:
    an imaging port that accepts a light input comprising an infrared component and a visible component wherein the light input is produced by a scene wherein the scene comprises a face comprising at least one eye comprising an iris;
    a wavelength selective mirror that directs the visible component along a first optical path and directs the infrared component along a second optical path;
    an IR optics module and an IR sensor array positioned on the second optical path wherein the IR sensor array produces an IR image with a centered said iris;
    a visible light optics module and a visible light sensor positioned on the first optical path wherein the visible light sensor produces a visible light image that comprises a face image comprising at least one eye image; and an image processing module that analyzes both the visible light image and IR image to determine an iris location from the visible light image and isolate an iris image from the IR image to recognize and identify a person based on characteristics of said iris.

2. The system of claim 1 further comprising an IR flash illuminator wherein the production of the IR image is synchronized to the production of an IR flash.

3. The system of claim 1 further comprising a driven stage wherein the driven stage redirects the second optical path to position the iris image on the IR sensor array.

4. The system of claim 1:
wherein the visible light optics module includes a first driven focuser;
wherein the IR lens module comprises a second driven focuser; and
wherein an auto focus module controls the first driven focuser and also controls the second driven focuser.

5. An iris imaging system comprising:
an imaging port that accepts a light input comprising an infrared component and a visible component wherein the light input is produced by a scene;
a wavelength selective mirror that directs the visible component along a first optical path and directs the infrared component along a second optical path;
a visible light sensor positioned on the first optical path wherein the visible light sensor produces a visible light image;
an image distance separator positioned on the second optical path that separates a first infrared component and a second infrared component from the infrared component wherein the infrared component carries an infrared image, wherein the first infrared component carries a first subimage, wherein the second infrared component carries a second subimage, and wherein the first subimage and the second subimage are different areas of the infrared image;
an infrared sensor positioned to receive the first infrared component and the second infrared component to thereby produce a two-part infrared image; and
an iris location determined from the visible light image and an iris image obtained from the two-part infrared image to recognize and identify a person based on characteristics of said iris.

6. The system of claim 5:
wherein the visible light image comprises a face image comprising a first eye image and a second eye image;
wherein the first eye image comprises a first iris image and wherein the second eye image comprises a second iris image;
wherein an iris separation distance is determined from the face image, wherein the iris separation distance is the distance between the first iris and the second iris; and
wherein the image distance separator is a driven image distance separator that adjusts the separation of the first infrared component and the second infrared component to compensate for the iris separation distance.

7. The system of claim 5 further comprising an IR flash illuminator wherein the production of the IR image is synchronized to the production of an IR flash.

8. The system of claim 5 further comprising a driven stage wherein the driven stage redirects the first optical path, or redirects the second optical path and wherein "or" is inclusive.

9. The system of claim 5:
wherein the visible light image comprises a face image comprising at least one eye image; and
wherein an iris location is determined from the face image and isolates an iris image from the IR image.

10. The system of claim 5 further comprising a driven stage wherein the iris image is positioned on the IR sensor array by moving the driven stage based on the iris location.

11. The system of claim 5 further comprising:
an IR flash illuminator wherein the production of the IR image is synchronized to the production of an IR flash;
an image processing module, a motion control module, and a driven stage;
wherein the visible light image comprises a face image comprising a first eye image and a second eye image;
wherein the first eye image comprises a first iris image and wherein the second eye image comprises a second iris image;
wherein the image processing module determines an iris separation from the face image, wherein the iris separation is the distance between the first iris and the second iris;
wherein the image distance separator is a driven image distance separator that adjusts the separation of the first infrared component and the second infrared component to compensate for the iris separation;
wherein the driven stage positions at least one iris image on the IR sensor array;
wherein the visible light optics module comprises a first driven focuser;
wherein the IR lens module comprises a second driven focuser; and
wherein an auto focus module controls the first driven focuser and also controls the second driven focuser.

12. The system of claim 5 further comprising:
an image processing module, a motion control module, a driven stage, and a steered collimated IR light source;
wherein the visible light image comprises a face image including a first eye image and a second eye image;
wherein the first eye image comprises a first iris image and wherein the second eye image comprises a second iris image;
wherein the image processing module determines an iris separation from the face image, wherein the iris separation is the distance between the first iris and the second iris;
wherein the image processing module determines at least one iris location from the face image;
wherein the image distance separator is a driven image distance separator that adjusts the separation of the first infrared component and the second infrared component to compensate for the iris separation;
wherein the driven stage positions at least one iris image on the IR sensor array;
wherein the visible light optics module comprises a first driven focuser;
wherein the IR lens module comprises a second driven focuser;
wherein an auto focus module controls the first driven focuser and also controls the second driven focuser; and
wherein the steered collimated IR light source is automatically steered based on the at least one iris location before the IR image is produced.

13. An iris imaging method comprising:
obtaining a light input from an imaged scene comprising a face;
splitting the light input into a visible light component and an infrared light component;

producing a visible light image comprising a face image wherein the face image comprises a first eye image and a second eye image eye image;

adjusting the infrared light component to isolate and magnify a first iris subimage and a second iris subimage onto an infrared imaging sensor;

producing an infrared image comprising the first iris subimage and the second iris subimage; and analyzing both the visible light image and the infrared image to determine a first iris location and a second iris location from the visible light and isolating an iris image from the first iris subimage and the second iris subimage to recognize and identify a person based on characteristics of said iris.

14. The method of claim 13 further comprising producing an infrared light flash wherein the production of the infrared light flash and the production of the infrared image are synchronized.

15. The method of claim 13 further comprising illuminating the imaged scene with a collimated infrared light source that is steered to point at the iris location after the iris location is determined and before the IR image is produced.

16. The method of claim 13 further comprising:

determining the location of the face; and aiming a collimated infrared light source at the face before producing the infrared image.

17. The method of claim 16 further comprising producing an infrared light flash from the collimated infrared light source wherein the production of the infrared light flash and the production of the infrared image are synchronized.

\* \* \* \* \*